(12) United States Patent
Avraham et al.

(10) Patent No.: US 10,944,817 B2
(45) Date of Patent: Mar. 9, 2021

(54) SYSTEMS AND METHODS FOR SEGMENTED DATA TRANSMISSION (71) Applicant: OMNISTREAM LTD., Ramat Hasharon (IL)

(72) Inventors: Hagay Avraham, Ramat Hasharon (IL); Avi Mordehay Sharir, Ramat Hasharon (IL); Almog Noyberg, Ramat Hasharon (IL)

(73) Assignee: OMNISTREAM LTD., Ramat Hasharon (IL)

( * ) Notice: Subject to any disclaimer, the term of this patent is extended or adjusted under 35 U.S.C. 154(b) by 0 days.

(21) Appl. No.: 16/320,476

(22) PCT Filed: Jul. 18, 2017

(86) PCT No.: PCT/IL2017/050807
§ 371 (c)(1),
(2) Date: Jan. 24, 2019

(87) PCT Pub. No.: WO2018/051326
PCT Pub. Date: Mar. 22, 2018

(65) Prior Publication Data
US 2019/0268406 A1  Aug. 29, 2019

(30) Foreign Application Priority Data
Sep. 14, 2016 (IL) .......................................... 247823

(51) Int. Cl.
*H04L 29/08* (2006.01)
*H04L 29/06* (2006.01)
*H04N 21/63* (2011.01)
*H04N 21/2743* (2011.01)
*H04N 21/2343* (2011.01)
(Continued)

(52) U.S. Cl.
CPC ........ *H04L 67/1085* (2013.01); *H04L 65/601* (2013.01); *H04L 65/602* (2013.01);
(Continued)

(58) Field of Classification Search
CPC . H04L 67/1085; H04L 65/601; H04L 65/602; H04L 67/06; H04L 67/108; H04N 21/2343; H04N 21/2743; H04N 21/632; H04N 21/8456; H04N 21/21805; H04W 4/18; H04W 4/185
(Continued)

(56) References Cited

U.S. PATENT DOCUMENTS

2006/0234684 A1   10/2006   Shin
2008/0299988 A1   12/2008   Dawson et al.
(Continued)

FOREIGN PATENT DOCUMENTS

WO    2016108150    7/2016

OTHER PUBLICATIONS

International Search Report PCT/IL2017/050807; Completed Oct. 22, 2017; dated Oct. 22, 2017 3 pages.
(Continued)

*Primary Examiner* — Nicholas R Taylor
*Assistant Examiner* — Chong G Kim
(74) *Attorney, Agent, or Firm* — The Roy Gross Law Firm, LLC; Roy Gross (57) ABSTRACT

The present invention relates to system and methods for segmented data transmission. One example comprises steps of: connecting a plurality of computerized devices to each other; designating at least one master device from the plurality of computerized devices; designating remainder of devices as slave devices; producing a content originated from said at least one master device; segmenting the content into a plurality of data-streams; transmitting at least one data-stream of said plurality of data-streams to slave devices; uploading said plurality of data-streams to a server-computer; assembling said plurality of data-streams into said content.

18 Claims, 9 Drawing Sheets

(51) Int. Cl.
  *H04N 21/845* (2011.01)
  *H04W 4/18* (2009.01)
  *H04N 21/218* (2011.01)
(52) U.S. Cl.
  CPC ............ *H04L 67/06* (2013.01); *H04L 67/108* (2013.01); *H04N 21/2343* (2013.01); *H04N 21/2743* (2013.01); *H04N 21/632* (2013.01); *H04N 21/8456* (2013.01); *H04N 21/21805* (2013.01); *H04W 4/18* (2013.01); *H04W 4/185* (2013.01)
(58) Field of Classification Search
  USPC .......................................................... 709/209
  See application file for complete search history.

(56) References Cited

U.S. PATENT DOCUMENTS

| 2011/0122812 | A1* | 5/2011 | Jeong | ................... | H04W 36/18 370/328 |
|---|---|---|---|---|---|
| 2012/0163255 | A1 | 6/2012 | Choi | | |
| 2014/0079022 | A1* | 3/2014 | Wang | ................... | H04W 36/22 370/331 |
| 2014/0280990 | A1* | 9/2014 | Dove | ................... | H04L 65/601 709/228 |
| 2015/0181165 | A1* | 6/2015 | Iltus | ........................ | H04N 7/15 348/14.09 |
| 2015/0249845 | A1* | 9/2015 | Tirosh | ................ | H04N 21/2408 725/62 |

OTHER PUBLICATIONS

Written Opinion of the International Searching Authority PCT/IL2017/050807 dated Oct. 22, 2017 5 pages.

International Preliminary Report on Patentability PCT/IL2017/050807 dated Jan. 6, 2019 20 pages.

Supplementary European Search Report, Application No. 17850403.1-1218, 4 pages, Jun. 7, 2019.

* cited by examiner

SYSTEMS AND METHODS FOR SEGMENTED DATA TRANSMISSION

RELATED APPLICATIONS

This application is a National Phase of PCT Patent Application No. PCT/IL2017/050807 having International filing date of Jul. 18, 2017, which claims priority to IL application No. 247823 filed on Sep. 14, 2016. The contents of the above applications are all incorporated by reference as if fully set forth herein in their entirety.

FIELD OF THE INVENTION

The present invention relates generally to the field of mobile data transmission systems and methods. More specifically, the present invention relates to the field of segmented mobile data transmission systems and methods.

BACKGROUND OF THE INVENTION

Mobile transmission technology has many uses. For instance, smartphone users regularly upload and 'share' data (any kind of data including video, audio, and documents) using the smartphone's cellular network (such as GPRS, GSM, CDMA, LTE, UMTS), and wireless networks such as WIFI (802.11b,g,n), BLUETOOTH.

For some uses, such as uploading short low-resolution videos, the bandwidth of the smartphone's active network suffices and allows for a relatively short upload time.

However, in many situations, transmission of data via standard mobile transmission means and methods, is not effective. For instance, uploading large files is not viable in locations without WIFI coverage or due to insufficient upload bandwidth supplied by existing cellular networks.

Moreover, real-time streaming and broadcasting of information via a cellular network is not effective. This is mainly due to the fact that such cellular networks rarely provide sufficient bandwidth for streaming live real-time broadcasts.

Several attempts were made to solve the above mentioned problems. For example, U.S. Pat. No. 7,948,933 B2 provides a virtual broadband transmitting unit that includes a stream generator to generate a multiplicity of data streams from an incoming media datastream, and a transmission manager to control the upload of the multiplicity of data streams along a multiplicity of transmission channels to at least one wireless communication network. A virtual broadband receiver includes means to receive a multiplicity of media data streams from a multiplicity of data connections, and an assembly engine to assemble the data streams into a single media stream.

Yet, several shortcomings and deficiencies in the field still remain, for example:
a. Existing solutions require the use of dedicated devices, resulting in waste and inefficiency.
b. A dedicated device requires constant upgrading to adapt to functionality of current technologies. For example, emergence of a new cellular network protocol may require upgrading the device.
c. Existing solutions that utilize a dedicated device, require a standalone input device (i.e. computer or camera) to provide the file for transmission.
d. In some cases, uploading data from a single device is impaired due to network resilience issues, in certain locations, network coverage may just not be available. In other situations, only some of the carrier's active networks shall be available.
e. Transmitting data from a single device via several cellular network channels results in excessive cellular radiation effected on a body of an adjacent user.

In light of the above description of the current state of the art, it is clear that there is a long-standing need for a solution that employs a different approach to resolve the issues and deficiencies in existing attempted solutions in the field.

SUMMARY OF THE INVENTION

The present invention relates to systems and methods for segmented data transmission. The systems and methods of the present invention involve mainly (a) segmenting content (e.g. a file or a stream of media content) originating from a designated 'master' computerized device into plurality of data-streams, (b) transmitting each data-stream to other connected designated 'slave' computerized devices, (c) uploading each data-stream to a single server via the devices' uplink, (d) assembling the plurality of streams to the content.

The present invention provides many advantages over the prior art, among others, the following:
a. The present invention utilizes common computerized devices such as smartphones and laptops and does not require dedicated devices, preventing waste and inefficiency.
b. The present invention does not require upgrade of the system's components, since users regularly upgrade their smartphones and computers.
c. Since the present invention utilizes common computerized devices, a standalone input device (computer or digital camera) is not required since the devices already have means such for creation or selection of content for transmission.
d. Uploading data from multiple devices via several cellular network channels overcomes resiliency issues resulting from uploading using a single device.
e. It is not necessarily the case that a device that concurrently transmits through a user's body via multiple network channels causes excessive cellular radiation effected on the user.

It is within the provision of the invention that a plurality of computerized devices are collectively designated as master-devices, wherein a plurality of master-devices produce content simultaneously.

It is within the provision of the invention that content produced by said plurality of master-devices is 3D content. 3D content refers to videos and photographs of 2 adjacent views of an object from the same position, simulating human eyesight. Such 3d content is interpreted by human eyes as 3D with assistance from various means, such as specialized glasses.

This aspect of the invention enables producing 3D content without the need for specialized cameras and smartphones having 2 adjacent lenses and sensors. In this aspect of the invention, 3D content is generated by positioning 2 master-devices adjacently to one another and facing a common object; capturing 2 contents from both master-devices; segmenting content to a plurality of data-streams; transmitting these data-streams to slave-devices; uploading data-streams to server; assembling data-streams to the two contents; overlaying said 2 contents one atop the other into a single 3D content.

It is within the provision of the invention that content produced by said plurality of master-devices is panoramic content.

Panoramic content hereinafter refers to videos or photographs having a capture angle wider than the typical capture angle of the camera. Panoramic photographs are traditionally produced by capturing a view in a certain direction; pointing the camera device to a new direction, capturing the view in said new direction; and repeating these steps until capturing view from all desired directions; and subsequently combining all captured views to a single photograph.

This aspect of the invention enables producing panoramic photographs without the need to capture views multiple times from multiple directions. Furthermore, this aspect of the invention enables producing panoramic videos which were previously unattainable other than from special cameras having multiple lenses spread radially upon the surface of a sphere or other shape.

In this aspect of the invention, panoramic content is generated by positioning a plurality of master-devices adjacently to one another facing various directions; capturing a plurality of content from all master-devices; segmenting said plurality of content to a plurality of data-streams; transmitting data-streams to slave-devices; uploading data-streams to server; assembling data-streams to the plurality of contents; combining said plurality of contents into a single panoramic content.

It is within the provision of the invention that content produced by said plurality of master-devices is multimedia content from a plurality of capture angles.

For instance, the system may use the devices for broadcasting real-time video of a scene, filmed from various filming angles, (e.g. an interview or an event captured from various angles and positions). The system may display the interview from any captured angle at any point of time, and is also capable of displaying all angles simultaneously.

In this instance content is generated from a plurality of capture by: positioning a plurality of master-devices remotely to one another; capturing a plurality of contents from all master-devices; segmenting said plurality of contents to plurality of data-streams; transmitting data-streams to slave-devices; uploading data-streams to server; assembling data-streams to the plurality of contents; broadcasting at least one of the plurality of contents to at least one recipient device.

It should be mentioned that with the foregoing aspects of the inventions, the method enables users of the invention to utilize their smartphones (and other types of digital devices) in new ways that were not previously possible.

It is within the provision of the invention that where a plurality of master devices are designated, there may be an additional step of identifying and selecting a mode of content-capture; wherein, a mode is identified based on the following parameters: master devices' relative location and orientation to each other; the mode is selected from the following modes: 3D capture, panoramic capture, and capture from multiple angles; wherein, selecting a mode is accomplished by performing the following steps: (1) if master devices are adjacent and facing a single object—selecting 3D capture mode; (2) if master devices are adjacent and facing various directions—selecting panoramic capture mode; if master devices are remote—selecting capture from multiple angles mode.

It should be mentioned that selecting a content-capture mode based on user input is also within the provision of the present invention.

It is within the provision of the invention that the method segmented data transmission further comprising the steps of:
  a. Periodically measuring latency of each of said computerized devices to server.
  b. If the latency of any of said devices exceeds a certain threshold, disconnecting said device from the server;

BRIEF DESCRIPTION OF THE DRAWINGS

Embodiments and features of the present invention are described herein in conjunction with the following drawings.

DETAILED DESCRIPTION OF PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

Figure 1:
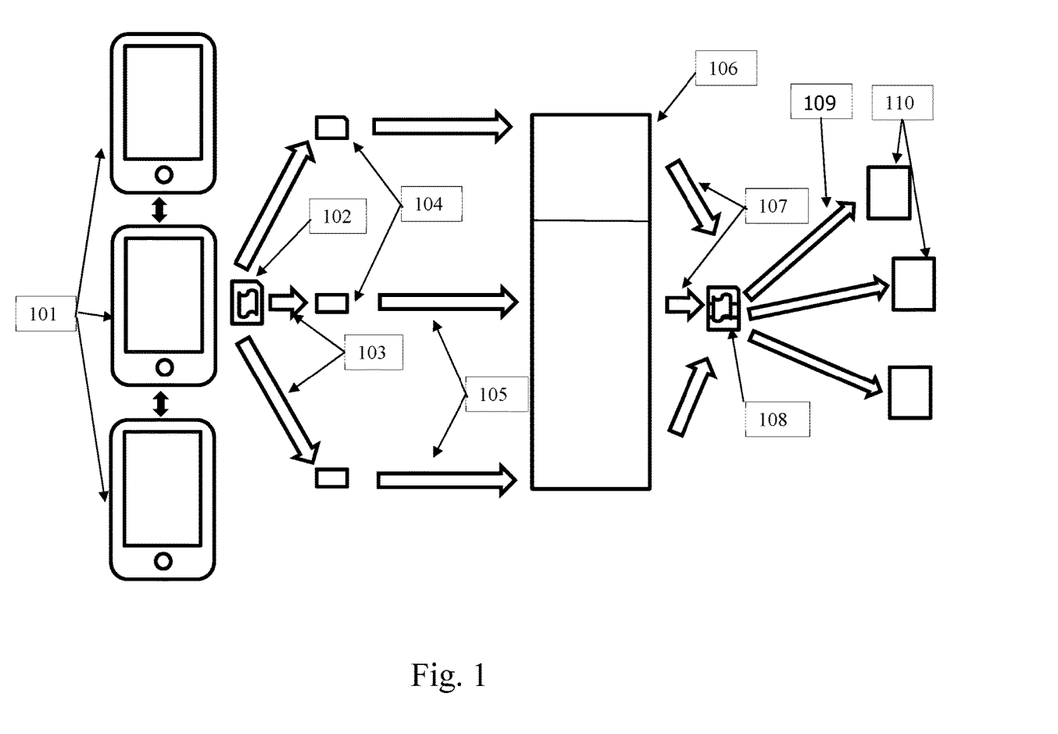
FIG. 1 is a diagram depicting a system for the methods of the present invention.

FIG. 1 depicts a system of the present invention executing a method of the present invention. The exemplary system comprises a server (106) and 3 computerized devices (101).

The computerized device may be a smartphone, tablet, laptop, or any computer with access to the internet and with connectivity via such means as a cellular network, Bluetooth and WIFI.

The computerized devices are connected to each other in a network and connected to a server (106) via the internet connections of the computerized devices (101). The computerized devices may be connected to each other by such means as an active Bluetooth connection, and a WIFI network.

It is contemplated that the computerized devices may be connected to each other by different means. For example, a first device may be connected to a second device by Bluetooth and the second device may be connected to a third device by WIFI.

Additionally, the middle of the computerized devices (101) is designated as a 'master' device and the rest are designated as 'slave' devices. The role of the master device is to produce content (102) originated therefrom; to segment the content (102) into a plurality of data-streams (104), and to transmit data-streams to the slave devices.

It is contemplated that the master device uses external means as a source such as, a dedicated camera and an external storage device.

The content may be any set of digital information including but not limited to: document files, multimedia content, executable files, databases.

As can be seen, after some data-streams are transmitted (103) to the slave devices, each of the computerized devices uses its internet connection to upload (105) its data-stream to the server (106). The server then assembles (107) the data-streams to the original content (108) originated from the master device. The server then makes the content available for download or broadcast (109) the content to various recipients (110).

Preferably, the content may be produced, segmented, transmitted, and uploaded to server, such that content is streamed to the server, assembled and broadcast in real-time to recipients.

It is contemplated that the server (106) designates the master/slave status of the various connected computerized devices. It is further contemplated that the server (106) can constantly edit in real time the status of each connected computerized device.

It is contemplated that a master/slave status of connected computerized devices is designated by said at least one of master devices.

Figure 2:
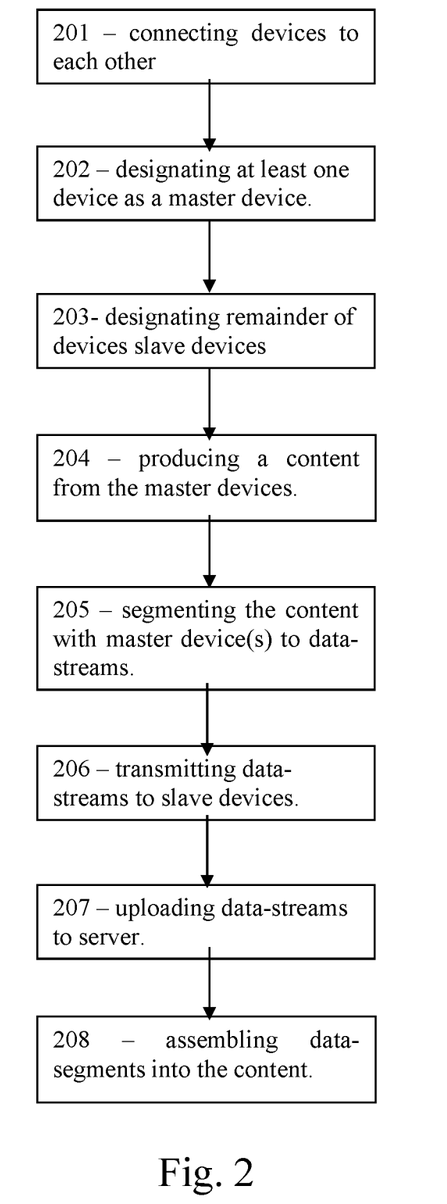
FIG. 2 is a flowchart of a method of the present invention.

FIG. 2 depicts a method for segmented data transmission comprising the steps of:
a. connecting a plurality of computerized devices to each other (201);
b. designating at least one master device from the plurality of computerized devices (202);
c. designating a remainder of the plurality of computerized devices (203) as slave devices;
d. producing a content originated from said at least one master device (204);
   this step may be accomplished by such actions as generating a multimedia feed with master device's camera and microphone or choosing a file (or a plurality of files) stored within the master device's memory.
   Where live multimedia feed is produced as content, it is contemplated to merge said live multimedia feed with real-time additions by interacting with UI elements of said at master device. For instance, live multimedia feed is generated by master device and played real-time on a screen of master device. A user then interacts with the UI of the master device such that various additions are added to the live feed in real time (e.g., placing emoticons in various places in feed, or writing commentaries in live-feed).
e. segmenting the content with said at least one master computerized device into a plurality of data-streams (205);
   segmenting the content may be executed by various known algorithms.
f. transmitting at least one data-stream of said plurality of data-streams to any slave devices (206);
g. uploading said plurality of data-streams to a server-computer (207);
h. assembling said plurality of data-streams into said content by said server-computer (208).

Figure 3:
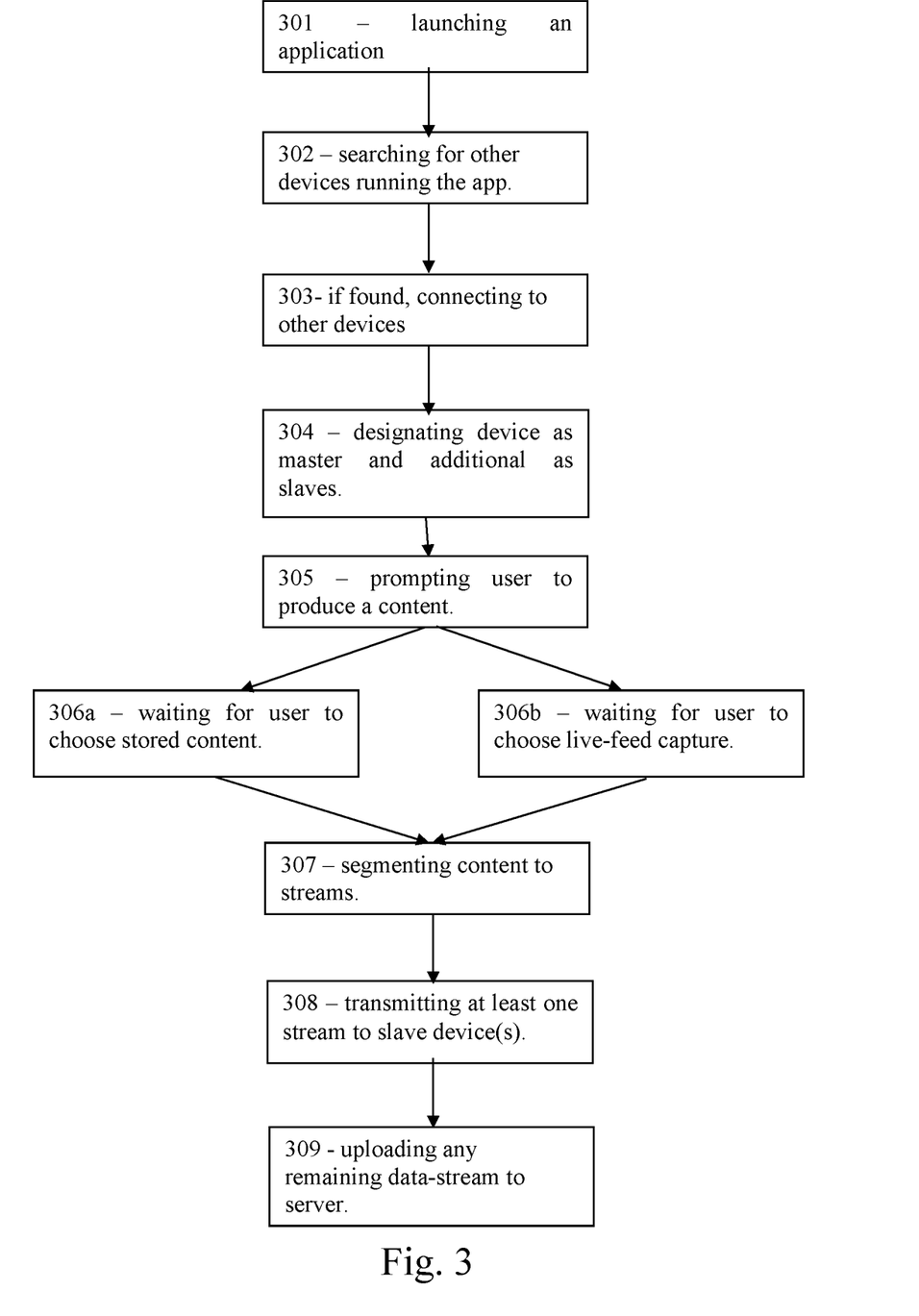
FIG. 3 is a flowchart of a method for an exemplary application running on a computerized device.
Figure 4:
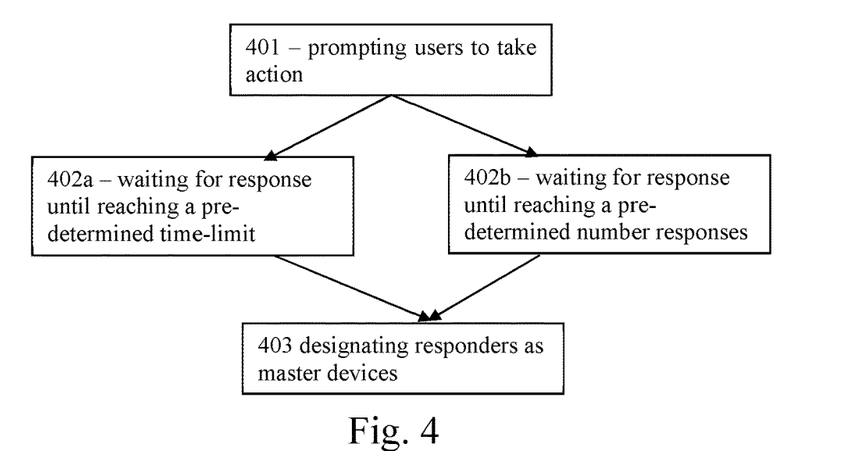
FIG. 4 is a flowchart of a method of the present invention.

FIG. 3 depicts a method of an exemplary application for executing upon a computerized device, comprising steps of:
a. launching an application installed on a computerized device (301);
b. searching connected network channels for other computerized devices running the application (302);
   the network channels may be either from wireless networks such as Bluetooth and WIFI or from physical connections such as USB protocol connection.
c. if at least one additional computerized device running the application is found, connecting to any found computerized device (303);
   It is contemplated that the connection to the found devices is made only upon executing a validation action to receive permission from said computerized devices. Such an action may be at least one of the following: receiving an authorization from the found device, entering a password by a searching device, and scanning a QR code.
d. designating said computerized device as a master device and the additional computerized devices as slave device (304);
e. prompting a user of the application to produce content (305)
f. waiting for the user to take action that is either choosing a content stored in memory (306a) of device or choosing capturing live feed (306b);
g. segmenting the content into a plurality of data-streams (307);
   this step may be accomplished by segmenting the content to a number of streams depending on the total number of connected computerized devices or based on the number of slave devices;
h. transmitting at least one data-stream of said plurality of data-streams to any slave device (308);
   it should be noted that a single data stream may remain on master device, in such case, the following step is initiated;
i. uploading any remaining data-stream to a server-computer (309);

FIG. 4 depicts a method for designating multiple computerized devices as master devices:
a. prompting a user of each connected computerized device to take an action (e.g. interacting with UI elements, shaking the device, entering a predefined password, etc) (401);
b. waiting for users to take action (402a,b);
   waiting may be terminated by any of various predetermined occurrences: among others, the following: reaching a time-limit (402a), reaching a pre-determined number of users taking action (402b);
c. designating responded computerized devices as master devices.

Figure 5:
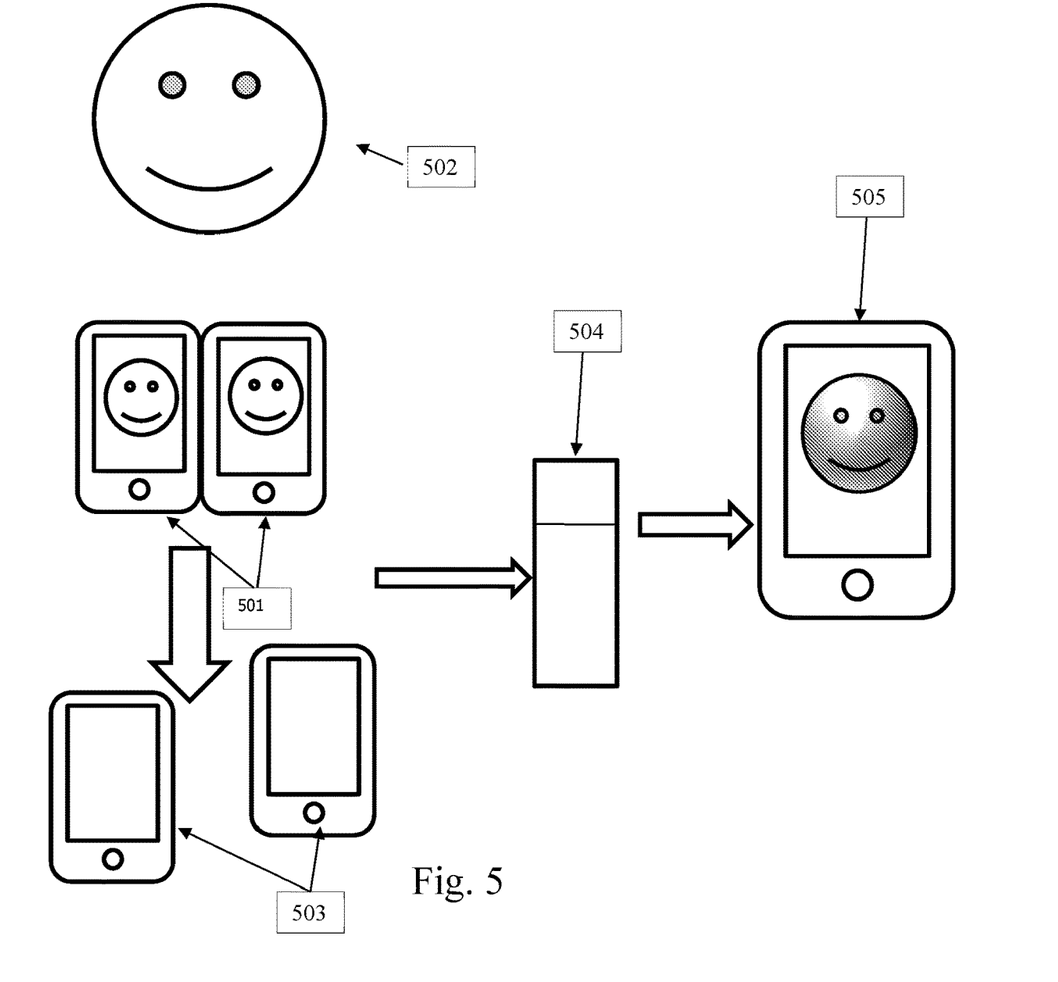
FIG. 5 is a diagram illustrating the operation a system executing a method of the present invention.
Figure 6:
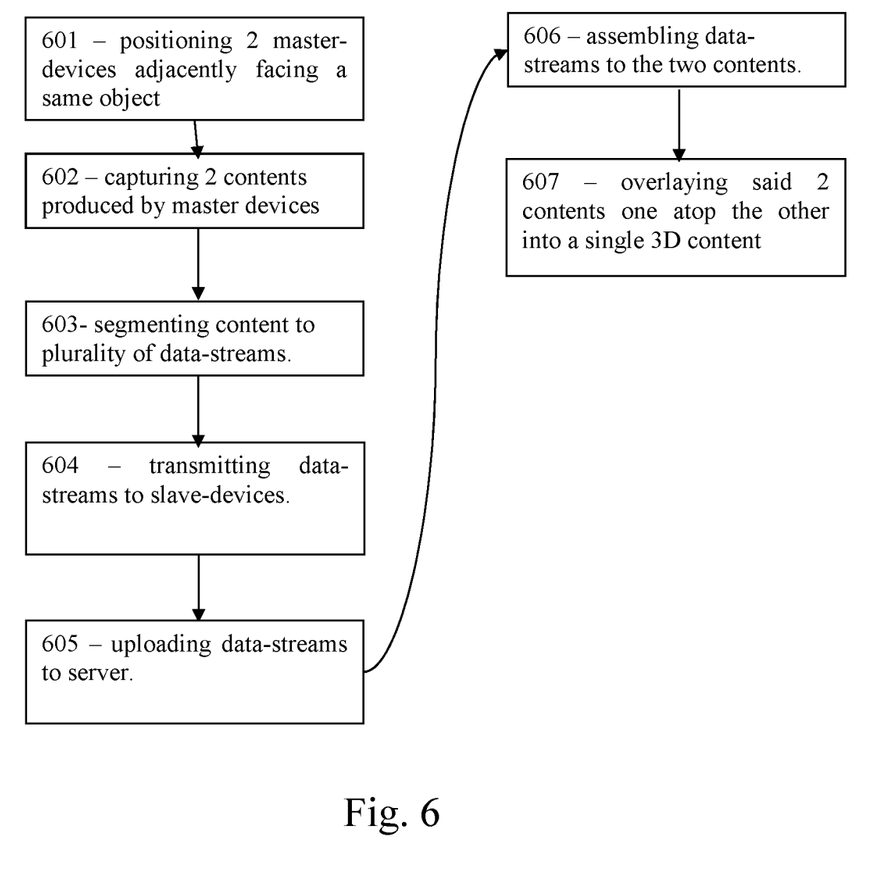
FIG. 6 is a flowchart of a method of the present invention.

FIG. 5 illustrates a system of the invention executing a method for generating 3D content. As can be seen, 2 master-devices (501) are positioned adjacently to one another and facing a same direction. Each of the 2 master-devices capture a video of a person (502); the 2 master devices each segment their video content into a plurality of data-streams and transmit them to a plurality of slave devices (503). All devices then, upload data-streams to server (504). The server assembles the data-streams into 2 videos and overlays both to a single 3D video. As can be seen, a recipient device (505) then plays the 3D video FIG. 6. depicts a method for generating 3D content involving the steps of: positioning 2 master-devices adjacently to one another and facing an object (601); capturing 2 contents produced by said 2 master-devices (602); segmenting content to plurality of data-streams (603); transmitting data-streams to slave-devices (604); uploading data-streams to server (605); assembling data-streams to the two contents (606); overlaying said 2 contents one atop the other into a single 3D content (607).

Figure 7:
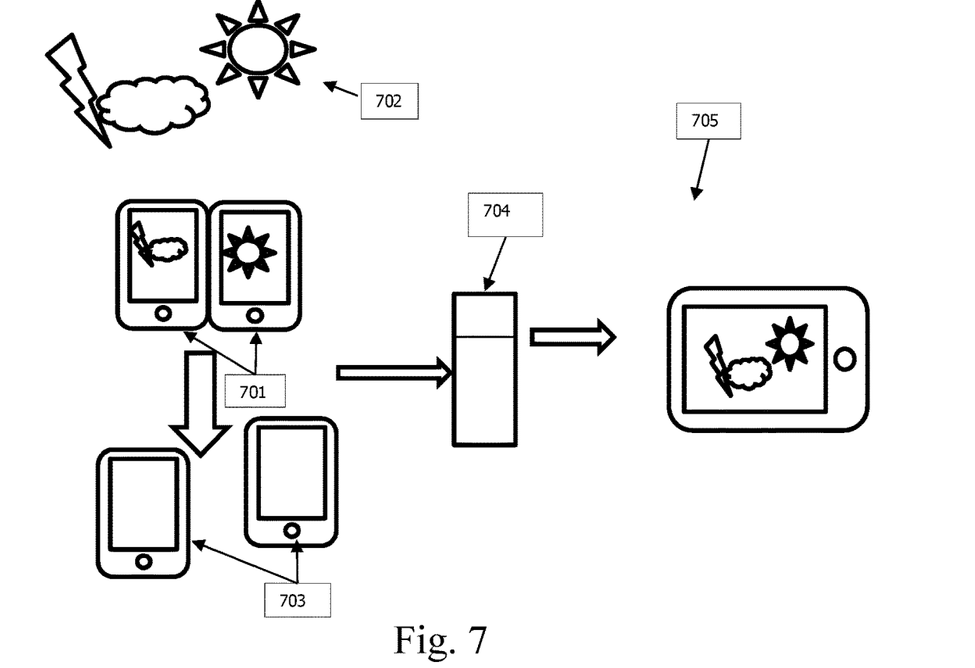
FIG. 7 is a diagram illustrating the operation a system executing a method of the present invention.

FIG. 7 illustrates a system of the invention executing a method for generating panoramic content. As can be seen, a plurality master-devices (701) are positioned adjacently to one another and facing various directions. Each of the 2 master-devices captures a video of a view (702); the plurality of master devices each segment their video content into a plurality of data-streams and transmit them to a plurality of slave devices (703). All devices then, upload data-streams to server (704). The server assembles the data-streams into a plurality of videos and combines all to a single panoramic video. As can be seen, a recipient device (705) then plays the panoramic video.

Figure 8:
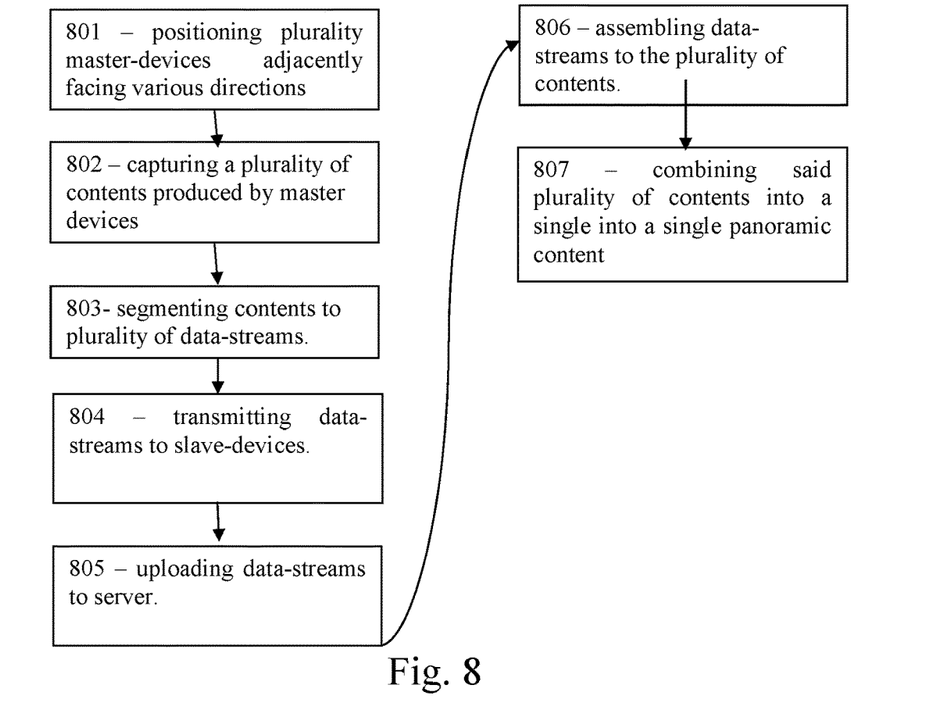
FIG. 8 is a flowchart of a method of the present invention.

FIG. 8 depicts a method for generating panoramic content involving the steps of: positioning a plurality of master-devices adjacently to one another facing in various directions (801); capturing a plurality of contents from all master-devices (802); segmenting said plurality of contents to plurality of data-streams (803); transmitting data-streams to slave-devices (804); uploading data-streams to server (805); assembling data-streams to the plurality of contents (806); combining said plurality of contents into a single panoramic content (807).

Figure 9:
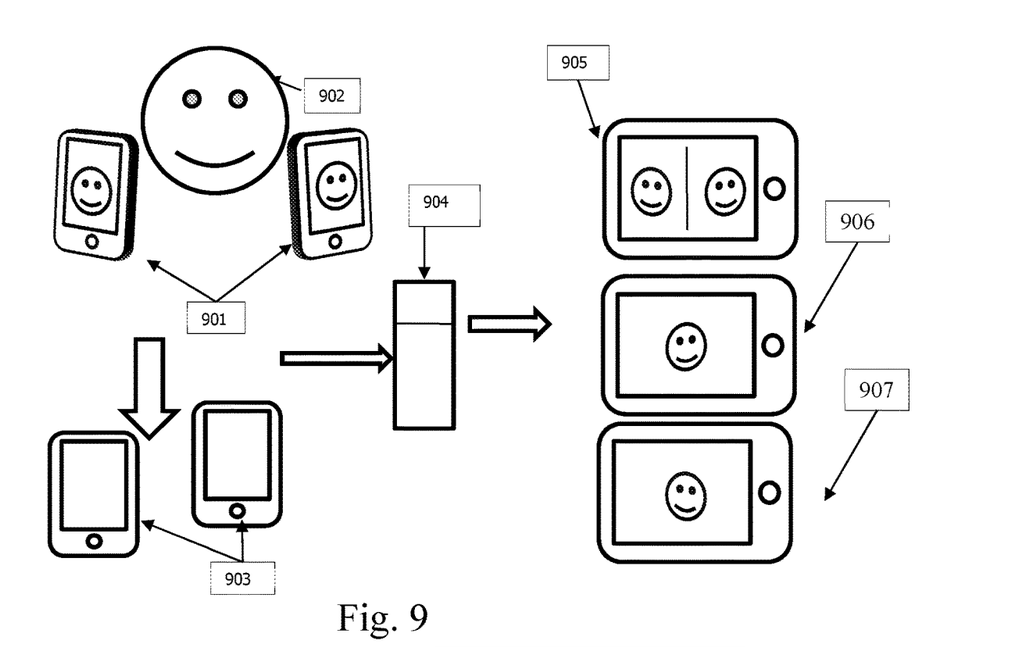
FIG. 9 is a diagram illustrating the operation a system executing a method of the present invention.

FIG. 9 illustrates a system of the invention executing a method for generating from a plurality of capture angles. As can be seen, a plurality master-devices (901) are positioned remotely to one another and facing, in this case, a single scene (902). Each of the plurality master-devices capture a video of the scene (902); the plurality of master devices each segment their video content into a plurality of data-streams and transmit them to a plurality of slave devices (903). All devices then, upload data-streams to server (904). The server assembles the data-streams into plurality of videos. As can be seen, various recipient devices (905-907) receive any of the assembled videos on demand. One of the recipient devices (905) plays all videos concurrently therefore, viewing the recorded scene from multiple angles.

It is contemplated that the server designates a single master device as active broadcasting its content to all recipients. In this instance, server further orders remaining master devices to capture video in low-resolution, therefore, saving uplink bandwidth and resources.

Figure 10:
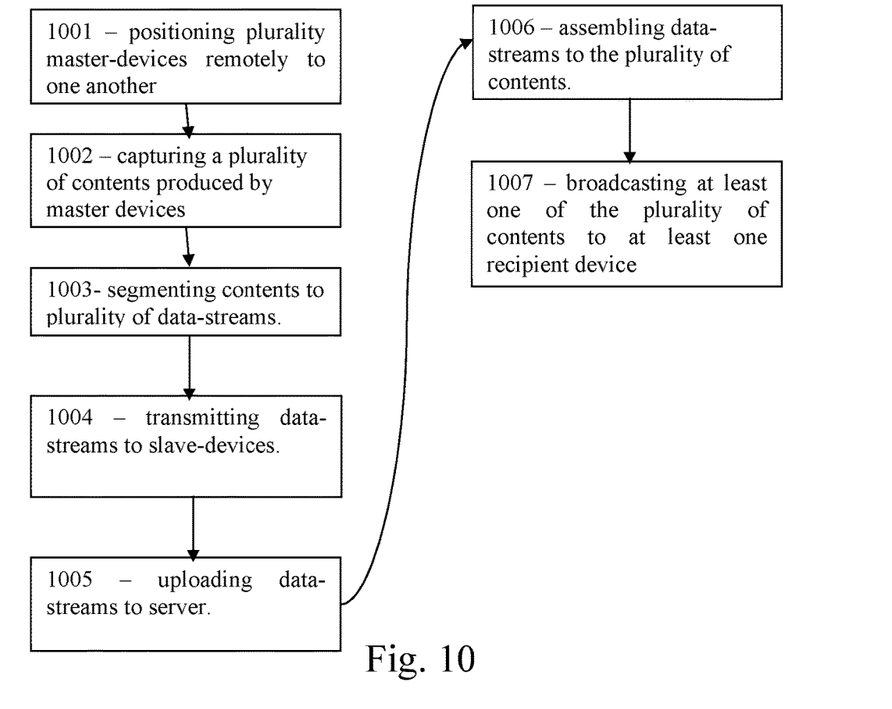
FIG. 10 is a flowchart of a method of the present invention.

FIG. 10 depicts a method for generating content from a plurality of capture angles involving the steps of: positioning a plurality of master-devices remotely to one another (1001); capturing a plurality of contents from all master-devices (1002); segmenting said plurality of contents to plurality of data-streams (1003); transmitting data-streams to slave-devices (1004); uploading data-streams to server (805); assembling data-streams to the plurality of contents (1006); broadcasting at least one of the plurality of contents to at least one recipient device (1007).

Figure 11A:
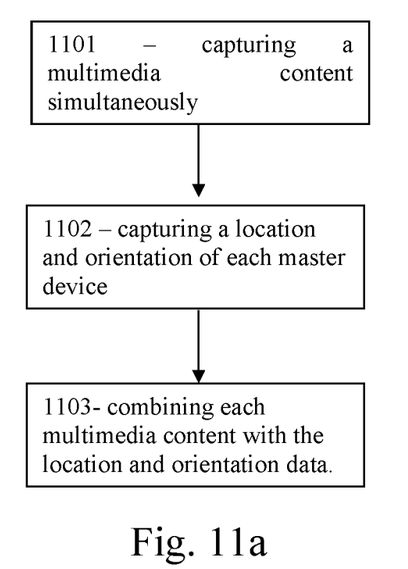
FIG. 11a is a flowchart of a method of the present invention.
Figure 11B:
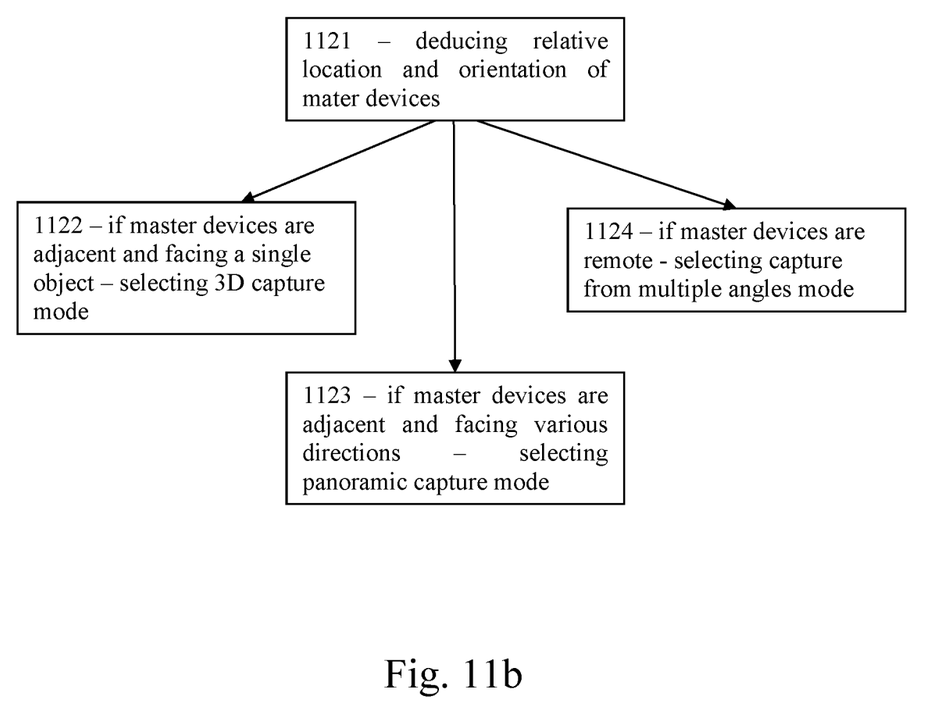
FIG. 11b is a flowchart of a method of the present invention.
Figure 12:
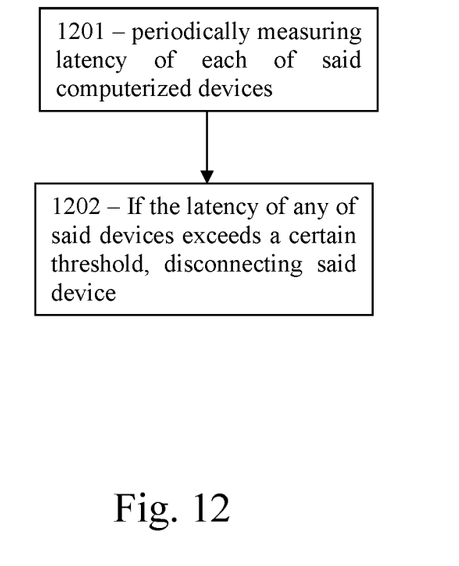
FIG. 12 is a flowchart of a method of the present invention.

FIG. 11a depicts a method for performing the step of capturing a plurality of contents in methods that employ the step of identifying and selecting a mode of content-capture:
a. capturing a multimedia content simultaneously by each of said plurality of master devices (1101);
b. capturing a location and orientation of each of said plurality of master devices during capturing of said plurality of multimedia content (1101);
c. combining each multimedia content with the location and orientation data into a single content (1101);

FIG. 11b depicts a method for performing the step of identifying and selecting a mode of content-capture:
a. deducing relative location and orientation of the plurality of master devices in relation to each other (1121);
b. if master devices are adjacent and facing a single object—selecting 3D capture mode (1122);
c. if master devices are adjacent and facing various directions—selecting panoramic 310 capture mode (1123);
d. if master devices are remote—selecting capture from multiple angles mode (1124);

FIG. 12 depicts additional steps for the method segmented data transmission:
a. Periodically measuring latency of each of said computerized devices to server computer (1201);
b. If the latency of any of said devices exceeds a certain threshold, disconnecting said device from the server-computer (1202);

Some embodiments of the present invention may periodically search for other devices to connect. In such embodiments, a contemplated system may also measure, any 'found' device's latency, and attempt a connection, upon meeting a condition such as: if measured latency is lower than a certain threshold, or if measured latency is lower than the latency of any other connected devices.

The foregoing description and illustrations of the embodiments of the invention has been presented for the purposes of illustration. It is not intended to be exhaustive or to limit the invention to the above description in any form.

Any term that has been defined above and used in the claims, should be interpreted according to this definition.

The invention claimed is:

1. A method for segmented data transmission comprising:
periodically searching connected network channels of a first computerized device for other computerized devices;
periodically measuring latency of found computerized devices to a server-computer;
connecting the found computerized devices to each other and to said first computerized device to establish a connected network of a plurality of connected computerized devices if said found computerized devices meet a certain latency limit to said server-computer, and disconnecting the at least one of the connected computerized devices from said server-computer if the latency between at least one of the plurality of connected computerized device and said server-computer exceeds a certain limit;
designating at least one or more master devices from the plurality of connected computerized devices and
a remaining of the plurality of connected computerized devices as slave devices, wherein
said at least one or more master devices is configured to:
produce a content originated from said at least one or more master devices,
segment said content into a plurality of data-streams and
transmit at least one different data-stream of said plurality of data-streams to at least one different slave device of the slave devices connected to said at least one or more master devices; and
wherein said different slave device of the slave devices is configured to
upload said different data stream of said plurality of data-streams to said server-computer which is configured to assemble different uploaded data streams of said plurality of data-streams into said content originated from said one or more master devices.

2. The method of claim 1, wherein said server-computer is configured to broadcast said content to a plurality of recipient devices.

3. The method of claim 1, wherein connecting said plurality of computerized devices to each other is accomplished with a software application installed on said plurality of connected computerized devices.

4. The method of claim 1, wherein designating said one or more master devices, is accomplished by designating a plurality of computerized devices which are configured to generate content to be broadcasted by said server-computer.

5. The method of claim 4, wherein designating a plurality of computerized devices comprises:
prompting a user of each connected computerized device to take action;
waiting for users to take action; and
designating responded computerized devices as master devices.

6. The method of claim 1, wherein the one or more master devices are configured to segment said content by segmenting the content to a number of data streams according to a number of connected computerized devices.

7. The method of claim 1, wherein the one or more master devices are configured to segment said content by segmenting the content to a number of data streams according to a number of said slave devices.

8. A method of segmented data transmission comprising:
periodically searching connected network channels of a first computerized device for other computerized devices;
periodically measuring latency of found computerized devices to a server-computer;
connecting the found computerized devices to each other and to said first computerized device to establish a connected network of a plurality of connected computerized devices, if said found computerized devices meet a certain latency limit to said server-computer and disconnecting the at least one of the connected computerized devices from said server-computer if the latency between at least one of the plurality of connected computerized device and said server-computer exceeds a certain limit;
designating from the plurality of connected computerized devices at least two master devices;
positioning said two master-devices adjacently to one another and facing a same object;
designating a remainder of the plurality of connected computerized devices as slave devices, wherein each master device of said at least two master devices is configured to produce content, segment said content into a plurality of data-streams, wherein a number of data streams equal to the number of said slave devices and transmit at least one different data-stream of said plurality of data-streams to at least one different slave device of the slave devices connected to said at least one or more master devices; and
the slave devices are configured to upload said plurality of data-streams to said server-computer which is configured to assemble said plurality of data-streams into said content originated from said at least two master device by overlaying contents produced by said two master devices one atop the other to produce a single 3D content.

9. The method of claim 6, wherein the at least one or more master devices comprise a plurality of master devices which are positioned adjacently to one another and facing various directions, wherein said server-computer is configured to combine contents produced by each on of said plurality of master devices into a single panoramic content.

10. The method of claim 6, wherein the at least one or more master devices comprises a plurality of master devices which are positioned remotely to one another, wherein said server-computer is configured to broadcast at least one content produced by the plurality of master devices to at least one recipient device, wherein the at least one recipient device is configured to choose between displaying one content or displaying all contents concurrently.

11. The method of claim 6, wherein the at least one or more master devices comprises a plurality of master devices which are positioned remotely to one another, wherein said server-computer is configured to: designate a single master device as active, broadcast it content to a plurality of recipients and order remaining master devices to capture video in low-resolution to save uplink bandwidth and resources.

12. A method of segmented data transmission comprising:
periodically searching connected network channels of a first computerized device for other computerized devices;
periodically measuring latency of found computerized devices to a server-computer;
connecting the found computerized devices to each other and to said first computerized device to establish a connected network of a plurality of connected computerized devices, if said found computerized devices meet a certain latency limit, to said server-computer and disconnecting the at least one of the connected computerized devices from said server-computer if the latency between at least one of the plurality of connected computerized device and said server-computer exceeds a certain limit;
designating at least one or more master devices from the plurality of connected computerized devices and a remaining of the plurality of connected computerized devices as slave devices, wherein said at least one or more master devices is configured to produce a content originated from said at least one or more master devices, segment said content into a plurality of data-streams to a number of data streams according to on a number of said connected computerized devices and transmit at least one different data-stream of said plurality of data-streams to at least one different slave device of the slave devices connected to said at least one or more master device; and wherein
the plurality of connected computerized devices is configured to upload said plurality of data-streams to said server-computer which is configured to assemble said plurality of data-streams into said content originated from said at least one or more master devices; identifying and selecting a mode of content-capture, said mode of content-capture by:
deducing a relative location and an orientation of the plurality of master devices in relation to each other if a plurality of master devices are adjacent and facing a single object, selecting a 3D capture mode, if the plurality of master devices are adjacent and facing various directions selecting a panoramic capture mode and if master devices are remote, selecting to capture from a multiple angles mode.

13. The method of claim 1, wherein said content comprises at least one of document files, multimedia content, executable files, and database content.

14. The method of claim 1, wherein said content is produced, segmented, transmitted, and uploaded to said server-computer, such that said content is streamed to said server-computer, assembled and broadcasted in a real-time to the plurality of recipient devices.

15. The method of claim 1 wherein said content is produced, segmented, transmitted and uploaded to said server-computer, such that said content is streamed to said server-computer, assembled and broadcasted in a real-time to the plurality of recipient devices.

16. The method of claim 1, wherein a master/slave status of the plurality of said connected computerized devices is designated by said server-computer.

17. The method of claim 16, wherein a master/slave status of the plurality of said connected computerized devices is being constantly updated by said server-computer.

18. The method of claim 16, wherein said master/slave status of the plurality of said connected computerized devices is designated by said at least one of master device.

* * * * *